E. R. POWELL.
Thill-Coupling.
No 64,565
Patented May 7, 1867.
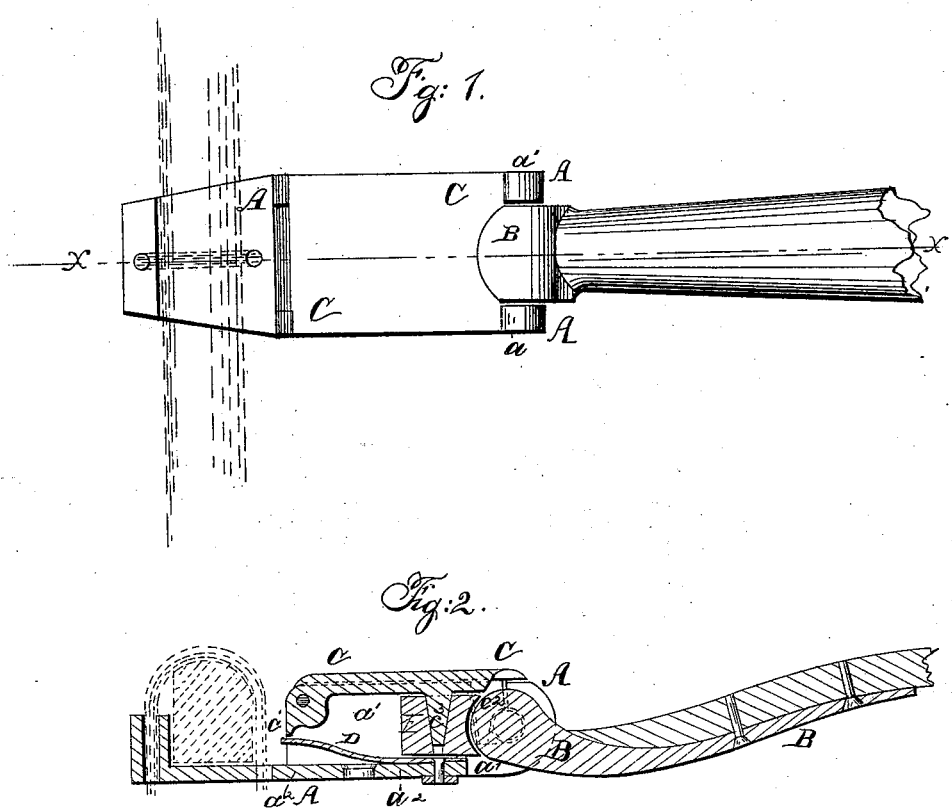
Witnesses
Theo Tusche
J. A. Sewill
Inventor
Edwin R Powell
Per Munn & Co
Attorney

United States Patent Office.

EDWIN R. POWELL, OF CAMBRIDGE, VERMONT.

Letters Patent No. 64,565, dated May 7, 1867.

---

IMPROVEMENT IN ATTACHING THILLS TO VEHICLES.

---

The Schedule referred to in these Letters Patent and making part of the same.

---

TO ALL WHOM IT MAY CONCERN:

Be it known that I, EDWIN R. POWELL, of Cambridge, Lamoille county, Vermont, have invented a new and improved Carriage-Clip or Thill-Coupling; and I do hereby declare that the following is a full, clear, and exact description thereof, which will enable others skilled in the art to make and use the same, reference being had to the accompanying drawings, forming part of this specification, in which—

Figure 1 is a top view of my improved coupling; and

Figure 2 is a vertical longitudinal section of the same, taken through the line $x$ $x$, fig. 1.

Similar letters of reference indicate corresponding parts.

My invention has for its object to furnish an improved thill-coupling, so constructed and arranged that the thills or pole may be shifted easily and quickly, and which will, at the same time, be perfectly secure and free from rattling; and it consists in an improved thill-coupling, formed by the combination of the chambered block, spring, and cap, having projections formed upon its under side, with each other, and in the combination of an India-rubber block-spring with the block and cap, the whole being constructed and arranged as hereinafter more fully described.

A is the block, which forms the main part of the coupling, the rear end of which extends back, and may be attached to the axle in any convenient and substantial manner. The block A is chambered or channelled longitudinally through its upper side, so as to leave side plates $a^1$ and a bottom plate, $a^2$. Upon the inner sides of the forward ends of the side plates $a^1$ are formed bearings or sockets for the reception of the pivoting pin of the thill-iron B. The front half of said sockets is made circular, and the rear half is open to the upper edge of said side plates $a^1$, as shown in dotted lines in fig. 2, to allow the instantaneous removal or insertion of the thill-iron B. C is the cap, fitting accurately upon the upper side of the chambered block A, and the side edges of the under side of which are rabbeted to give it a firmer seat. The rear end of the cap or plate C is pivoted between the rear ends of the side plates $a^1$, so that its forward end may be raised up to allow the thill-iron to be inserted or removed. Upon the rear end of the under side of plate or cap C is formed a projection, $c^1$, against which the spring D presses, to hold the said cap down to its place, and prevent its jarring up while being used. The spring D also holds it up when raised, so as to keep it out of the way in attaching and detaching the thill-irons. The forward end of the spring D is firmly secured to the bottom plate of the block A. Upon the side edges of the forward end of the plate C are formed key-shaped projections $c^2$, which fit into the open part of the sockets in which the pivoting pin of the thill-irons rests, and which are so formed that it will be impossible for the thill-irons to get into such a position as to press against the said projections in such a direction as to force them out and raise the cap or plate C. $c^3$ is a wedge-shaped projection, formed upon the under side of the plate or cap C, a little in front of its middle point, which enters a hole formed in the block-spring E, and forces it forward against the end of the thill-iron B, to hold the said thill-irons steady, and prevent rattling. E is a block-spring, fitting into the chamber in the block A, and having a horizontal circular groove in its forward end, fitting upon the end of the thill-iron B, as shown in fig. 2. The block E has also a square hole formed vertically through it for the reception of the wedge-shaped projection $e^3$, as shown in fig. 2. If desired, spring catches may be attached to the forward end of the plate C, to hold it down; but this I have not found to be necessary.

I claim as new, and desire to secure by Letters Patent—

1. An improved thill-coupling, formed by the combination of the chambered block A, spring D, and the pivoted plate or cap C, having projections $c^1$, $c^2$, and $c^3$ formed upon its under side, substantially as herein shown and described, and for the purpose set forth.

2. The combination of the India-rubber block-spring E, or equivalent, with the chambered block A and cap or plate C, substantially as herein shown and described, and for the purpose set forth.

The above specification of my invention signed by me this seventh day of February, 1867.

EDWIN R. POWELL.

Witnesses:
WM. F. MCNAMARA,
JAMES T. GRAHAM.